United States Patent
Lee et al.

(10) Patent No.: US 8,924,710 B2
(45) Date of Patent: Dec. 30, 2014

(54) METHOD AND APPARATUS FOR PROVIDING SESSION KEY FOR WUSB SECURITY AND METHOD AND APPARATUS FOR OBTAINING THE SESSION KEY

(75) Inventors: Sung-min Lee, Suwon-si (KR); Seung-jae Oh, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1497 days.

(21) Appl. No.: 11/648,676

(22) Filed: Jan. 3, 2007

(65) Prior Publication Data
US 2007/0157020 A1 Jul. 5, 2007

(30) Foreign Application Priority Data
Jan. 3, 2006 (KR) ........................ 10-2006-0000507

(51) Int. Cl.
*H04L 9/08* (2006.01)
*H04L 29/06* (2006.01)
*H04W 12/04* (2009.01)

(52) U.S. Cl.
CPC .............. *H04L 9/083* (2013.01); *H04L 63/061* (2013.01); *H04W 12/04* (2013.01); *H04L 9/0838* (2013.01); *H04L 9/0869* (2013.01); H04L 2209/805 (2013.01)
USPC ............ 713/155; 713/171; 380/259; 380/270

(58) Field of Classification Search
USPC ........... 713/155, 171; 380/258, 278, 259, 270
See application file for complete search history.

(56) References Cited

U.S. PATENT DOCUMENTS

| 5,016,276 | A | | 5/1991 | Matumoto et al. |
| 5,265,164 | A | * | 11/1993 | Matyas et al. ................. 380/30 |
| 5,745,573 | A | * | 4/1998 | Lipner et al. ................. 380/286 |
| 5,963,646 | A | | 10/1999 | Fielder et al. |
| 6,049,612 | A | * | 4/2000 | Fielder et al. ................. 380/44 |
| 6,201,871 | B1 | | 3/2001 | Bostley et al. |
| 6,895,504 | B1 | * | 5/2005 | Zhang et al. ................. 713/175 |
| 6,986,045 | B2 | * | 1/2006 | Campagna ................... 713/170 |
| 7,124,436 | B2 | * | 10/2006 | Okaue et al. ..................... 726/7 |
| 7,278,016 | B1 | * | 10/2007 | Detrick et al. .................. 713/2 |
| 7,412,061 | B2 | * | 8/2008 | Peinado et al. .............. 380/277 |

(Continued)

FOREIGN PATENT DOCUMENTS

| CN | 1294457 A | 5/2001 |
| JP | 02-056136 A | 2/1990 |

(Continued)

OTHER PUBLICATIONS

Wireless Universal Serial Bus Specification Revision 1.0, May 12, 2005, Wireless Universal Serial Bus Specification, pp. 120-136.

(Continued)

*Primary Examiner* — Amare F Tabor
(74) *Attorney, Agent, or Firm* — Sughrue Mion, PLLC

(57) ABSTRACT

A wireless universal serial bus (WUSB) security is provided. A method of providing a session key to be used during a session between a host and a device creates the session key based on a seed key stored in a region that is not allowed by the device; and provides the session key to the device. Therefore, a user does not need to distribute information necessary for creating the session key (i.e., a connection context) to a guest device.

14 Claims, 15 Drawing Sheets

(56) References Cited

U.S. PATENT DOCUMENTS

| | | | |
|---|---|---|---|
| 7,496,347 B2 * | 2/2009 | Puranik | 455/410 |
| 7,593,717 B2 * | 9/2009 | Marcovici et al. | 455/411 |
| 7,761,085 B2 * | 7/2010 | Johur | 455/411 |
| 2003/0088769 A1 | 5/2003 | Quick, Jr. et al. | |
| 2004/0147246 A1 | 7/2004 | Kim | |
| 2005/0154896 A1 * | 7/2005 | Widman et al. | 713/182 |
| 2006/0179305 A1 * | 8/2006 | Zhang | 713/168 |
| 2007/0098152 A1 | 5/2007 | Detrick et al. | |
| 2008/0267404 A1 | 10/2008 | Budde et al. | |
| 2009/0119505 A1 * | 5/2009 | Ward et al. | 713/156 |

FOREIGN PATENT DOCUMENTS

| | | | |
|---|---|---|---|
| JP | 02-093487 A | 4/1990 | |
| JP | 2980320 B2 | 9/1999 | |
| JP | 2980320 B2 | 11/1999 | |
| JP | 2003-179609 A | 6/2003 | |
| JP | 2003-224567 A | 8/2003 | |
| JP | 2004-096755 A | 3/2004 | |
| JP | 2005-057844 A | 3/2005 | |
| JP | 2005-167946 A | 6/2005 | |
| JP | 2005-229597 A | 8/2005 | |
| JP | 2005-535197 A | 11/2005 | |
| KR | 10-2006-0045669 A | 5/2006 | |

OTHER PUBLICATIONS

Office Action issued on Mar. 25, 2010 in counterpart Chinese Application No. 200710001530.8.
Office Action dated Apr. 8, 2011, in Chinese Application No. 200710001530.8.
Notice of Allowance dated Jun. 20, 2007, in counterpart Korean Application No. 10-2006-0000507.
Chinese Office Action issued in corresponding Chinese Patent Application No. 201010605318.4 dated Sep. 30, 2013.
Japanese Office Action issued in corresponding Japanese Patent Application No. 2007-000260 dated Jun. 19, 2012.
Communication dated Jun. 19, 2012, issued by the Japanese Patent Office in counterpart Application No. 2007-000260.
Communication, dated Apr. 2, 2013, issued by the Japanese Patent Office in counterpart Japanese Patent Application No. 2007-000260.
Communication dated Apr. 29, 2014, issued by the State Intellectual Office of P.R. China in counterpart Chinese Application No. 20071001530.8.
Communication dated Sep. 2, 2014 issued by the State Intellectual Property Office of the People's Republic of China in counterpart Chinese Patent Application No. 200710001530.8.

* cited by examiner

METHOD AND APPARATUS FOR PROVIDING SESSION KEY FOR WUSB SECURITY AND METHOD AND APPARATUS FOR OBTAINING THE SESSION KEY

This application claims priority from Korean Patent Application No. 10-2006-0000507, filed on Jan. 3, 2006, in the Korean Intellectual Property Office, the disclosure of which is incorporated herein in its entirety by reference.

BACKGROUND OF THE INVENTION

1. Field of the Invention

The present invention relates to wireless universal serial bus (WUSB) security, and more particularly to, a method and apparatus for providing a session key for WUSB security and a method and apparatus for obtaining the session key.

2. Description of the Related Art

After a universal serial bus (USB) that connects a computer and its peripheral devices was popularized, a wireless universal serial bus (WUSB) that supports the USB wirelessly was introduced because of the popularity the wireless LAN.

FIG. 1 is a diagram of a conventional WUSB system. Referring to FIG. 1, the conventional WUSB system comprises a host 2, devices 1~3 (or 31~33), and a guest device 34.

The host 2 is a computer system serving as a WUSB host. The devices 1~3 (or 31~33) and the guest device 34 are peripheral devices serving as WUSB devices, e.g., a WUSB keyboard, a printer, an external storage unit, a digital camera, etc. In particular, the devices 1~3 (or 31~33) are continuously connected to the host 2 and the guest device 34 is connected temporarily to the host 2 by a user.

According to WUSB standards, the host 2 generates a connection context (CC) necessary for creating a session key during a session between the host 2 and the guest device 34. The user distributes the session key to the guest device 34. The session key is called a pair-wise temporal key (PTK).

FIG. 2 is a flowchart of a conventional WUSB security communication method. Referring to FIG. 2, the host 2 generates the CC including a connection host ID (CHID), a connection device ID (CDID), and a seed key connection key (CK), and outputs the CC to a user 1 (Operation 201).

The user 1 distributes the CC to the guest device 34 connected to the host 2. The user 1 sees the CC output by the host 2, and inputs the CC to the guest device 34 using an input tool such as a keyboard. Alternatively, the user downloads the CC output by the host 2 in a recording medium such as a CD ROM, and uploads the downloaded CC to the guest device 34 (Operation 202).

The guest device 34 provides the CDID to the host 2 to request a connection with the host 2, and the host 2 transmits a response indicating that the guest device 34 is connected to the host 2 of the guest device 34 (Operation 203).

According to the WUSB standards, the host 2 and the guest device 34 exchange four messages with each other to obtain information necessary for creating a session key. A message exchange protocol is called a 4-way handshake.

Throughout the specification, HNonce and DNonce are random numbers. HNonce corresponds to a device and DNonce corresponds to a device or more often a guest device in the specification. TKID is the information for identifying the session key throughout the specification. The host 2 transmits a message M1 including information for identifying the session key, TKID, and a HNonce to the guest device 34 (Operation 204).

The guest device 34 generates a DNonce (Operation 205).

The guest device 34 creates a session key corresponding to the TKID based on the address of the host 2, the address of the guest device 34, the HNonce, the DNonce, and the SEED KEY CK (Operation 206).

The guest device 34 transmits a message M2 including the TKID and the DNonce to the host 2 (Operation 207).

The host 2 creates the session key corresponding to the TKID based on the address of the host 2, the address of the guest device 34, the HNonce, the DNonce, and the SEED KEY CK (Operation 208).

The host 2 calculates a message integrity code (MIC). Then, the host 2 transmits a message M3 including the TKID, the DNonce, and the MIC to the guest device 34 (Operation 209).

The guest device 34 calculates a MIC, if the MIC is identical to the MIC obtained from the host 2, installs the session key, and transmits a message M4 indicating the session key is successfully installed to the host 2 (Operation 210).

The guest device 34 performs secured communications with the host 2 using the session key during a session (Operation 211).

The host 2 deletes the CC regarding the guest device 34, and releases the session between the host 2 and the guest device 34 (Operation 212).

Information necessary for creating the session key (i.e., information corresponding to the CC), must be shared by the host 2 and the guest device 34 to perform secured communications using the session key. However, according to the WUSB standards, whenever a guest device is connected to the host 2, the user 1 distributes information necessary for creating the session key to the guest device, which is very burdensome to the user 1. In particular, the user 1 is burdened if guest devices are frequently connected to the host 2, resulting in decreased user convenience which is the purpose of WUSB.

According to the WUSB standards, since the user 1 must update the CC whenever a guest device is connected to the host 2, the entire WUSB system including a host and devices that share the CC must be updated, which gives a considerable load to the host and devices.

SUMMARY OF THE INVENTION

The present invention provides a method and apparatus alleviating the need to distribute a connection context (CC). A CC is information necessary for creating a session key to a guest device whenever the guest device is connected to a host.

According to an aspect of the present invention, there is provided a method of providing a session key to be used during a session between a host and a device, the method comprising: (a) creating the session key based on a seed key stored in a region that is not allowed by the device; and (b) providing the session key to the device.

According to another aspect of the present invention, there is provided an apparatus for providing a session key to be used during a session between a host and a device, the method comprising: a session key creator creating the session key based on a seed key stored in a region that is not allowed by the device; and a session key provider providing the session key to the device.

According to another aspect of the present invention, there is provided a computer-readable storage medium having embodied thereon a computer program for executing the method of providing a session key to be used during a session between a host and a device, the method comprising: (a) creating the session key based on a seed key stored in a region that is not allowed by the device; and (b) providing the session key to the device.

According to another aspect of the present invention, there is provided a method of obtaining a session key corresponding to a session between a host and a device, the method comprising: (a) obtaining first information required to create the session key from the host; (b) providing the first information to an apparatus for creating the session key to request the session key; and (c) obtaining the session key as a response to the request.

According to another aspect of the present invention, there is provided an apparatus for obtaining a session key corresponding to a session between a host and a device, the apparatus comprising: an information obtainer obtaining information required to create the session key from the host; a session key requester providing the information to an apparatus for creating the session key to request the session key; and a session key obtainer obtaining the session key as a response to the request.

According to another aspect of the present invention, there is provided a computer-readable storage medium having embodied thereon a computer program for executing the method of obtaining a session key corresponding to a session between a host and a device of claim 10, the method comprising: (a) obtaining first information required to create the session key from the host; (b) providing the first information to an apparatus for creating the session key to request the session key; and (c) obtaining the session key as a response to the request.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings.

Figure 1:
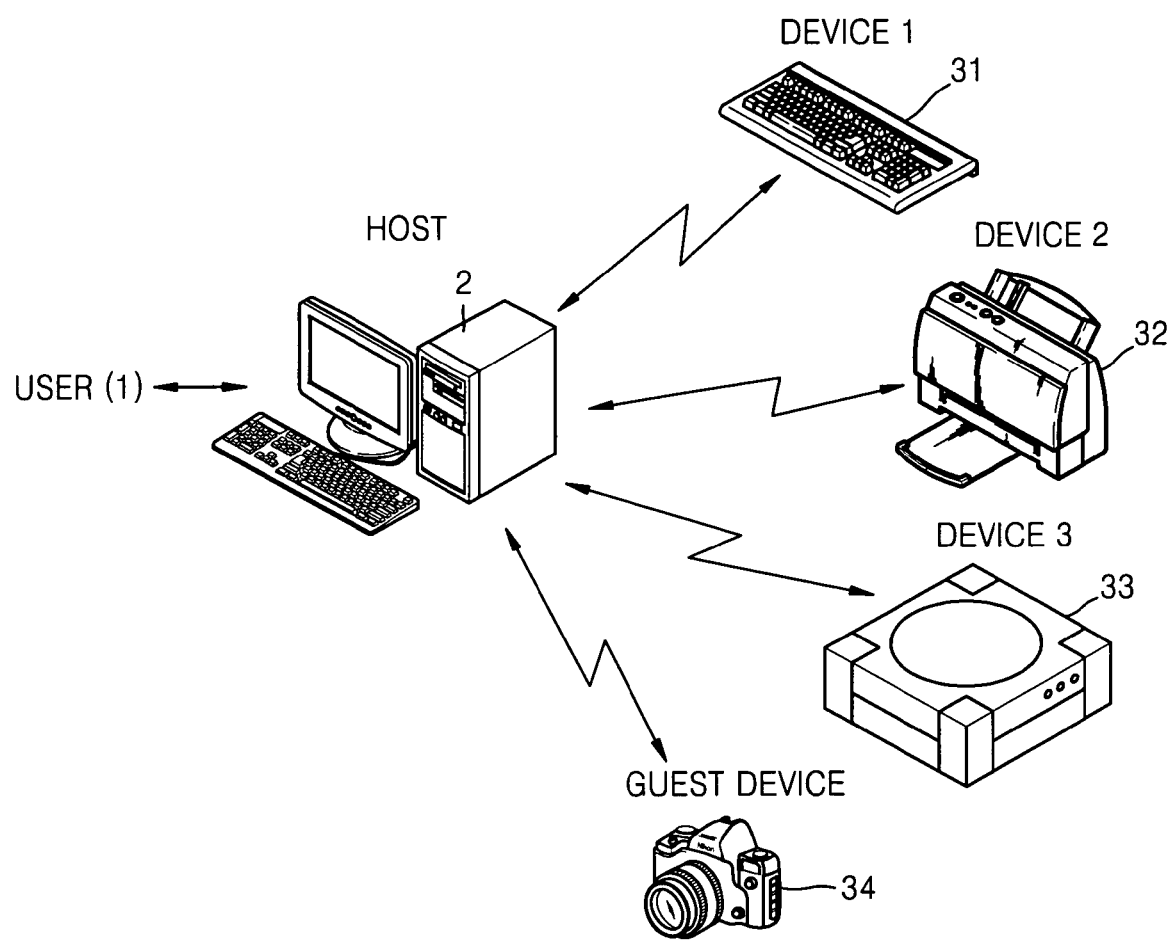
FIG. 1 is a diagram of a conventional wireless universal serial bus (WUSB) system.
Figure 2:
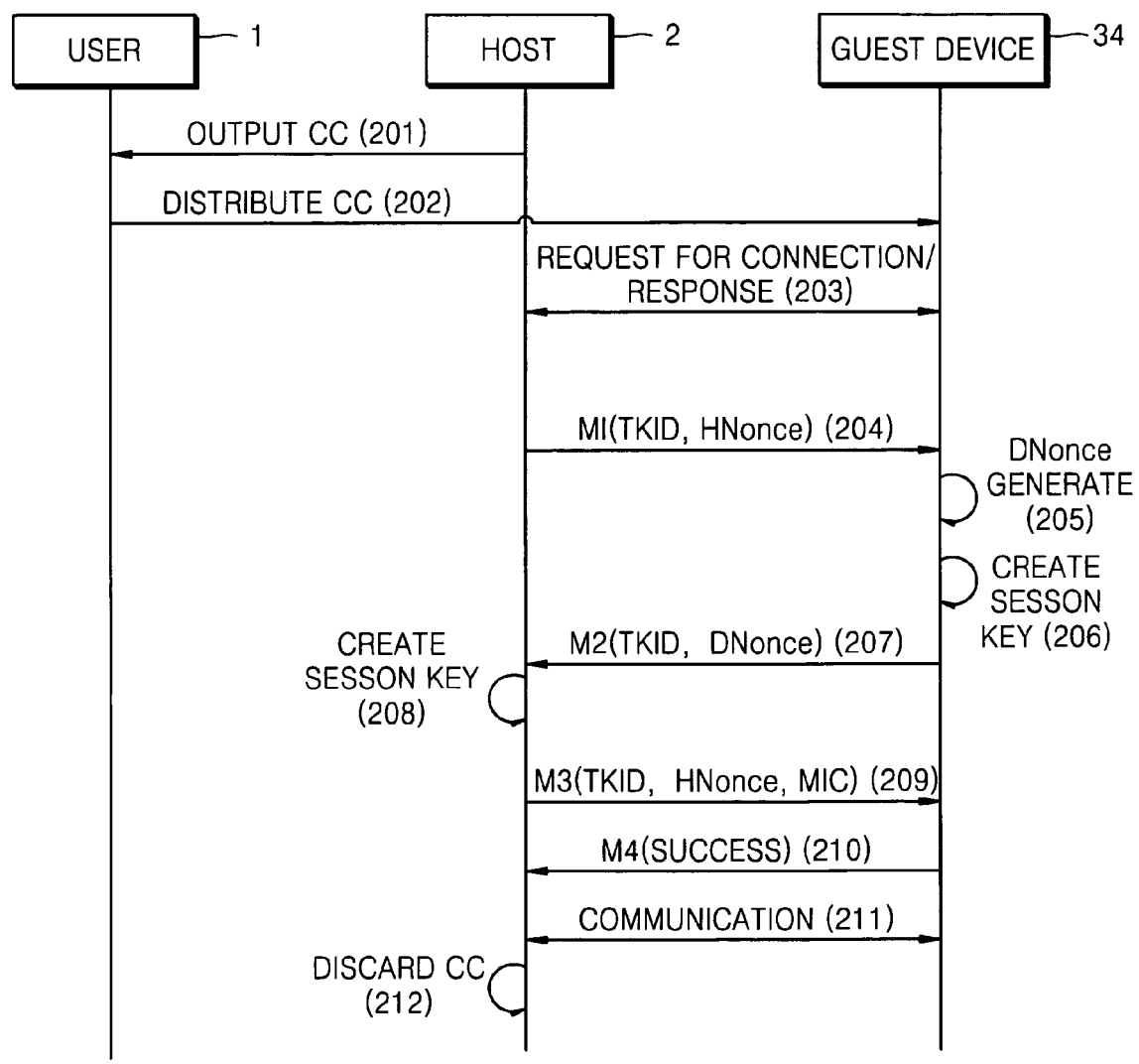
FIG. 2 is a flowchart of a conventional WUSB security communication method.
Figure 3:
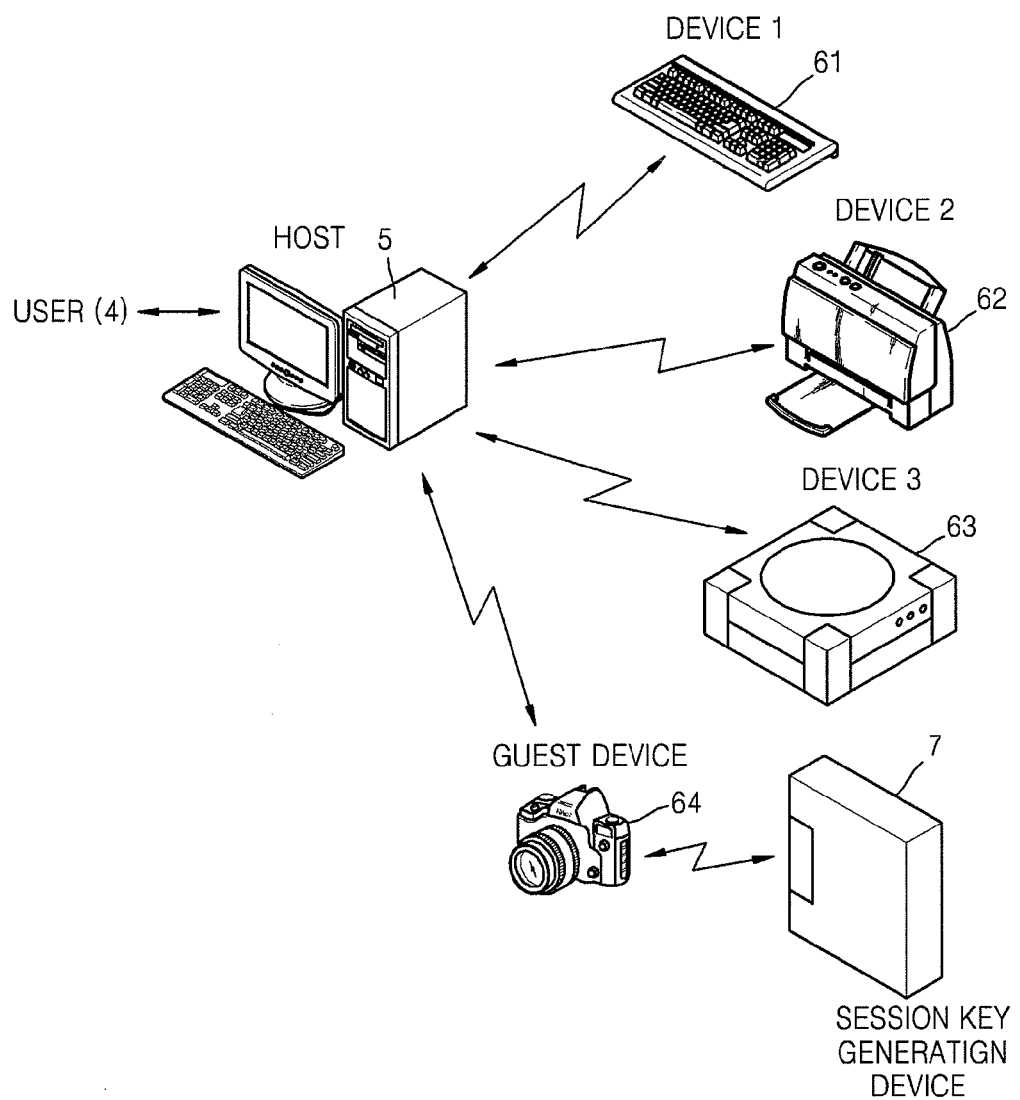
FIG. 3 is a diagram of a WUSB system according to an exemplary embodiment of the present invention.

FIG. 3 is a diagram of a wireless universal serial bus (WUSB) system according to an exemplary embodiment of the present invention. Referring to FIG. 3, the WUSB system comprises a host 5, devices 1~3 (or 61~63), a guest device 64, and a session key providing device 7.

The host 5 is a computer system serving as a WUSB host. The devices 1~3 (or 61~63) and the guest device 64 are peripheral devices serving as WUSB devices (e.g., a WUSB keyboard, a printer, an external storage unit, a digital camera, etc). In particular, the devices 1~3 (or 61~63) are connected to the host 5 and the guest device 64 is temporarily connected to the host 5 by the user 4.

In the present embodiment, the session key providing device 7 obtains information necessary for creating a session key from the host 5, and creates the session key based on that information. The session key providing device 7 provides the session key to an optional guest device whenever the optional guest device is temporarily connected to the host 5. Therefore, it is not necessary for the user 4 to distribute the information necessary for creating the session key (i.e. connection context, to the guest device 64). The session key providing device 7 holds a seed key connection key (CK) instead of the guest device 64. Therefore, it is not necessary to create the SEED KEY CK and update the CC whenever the optional guest device is connected to the host 5. The WUBS system of the current embodiment of the present invention uses the SEED KEY CK without update among constituents of the CC, and updates an ID of the guest device 64.

Figure 4:
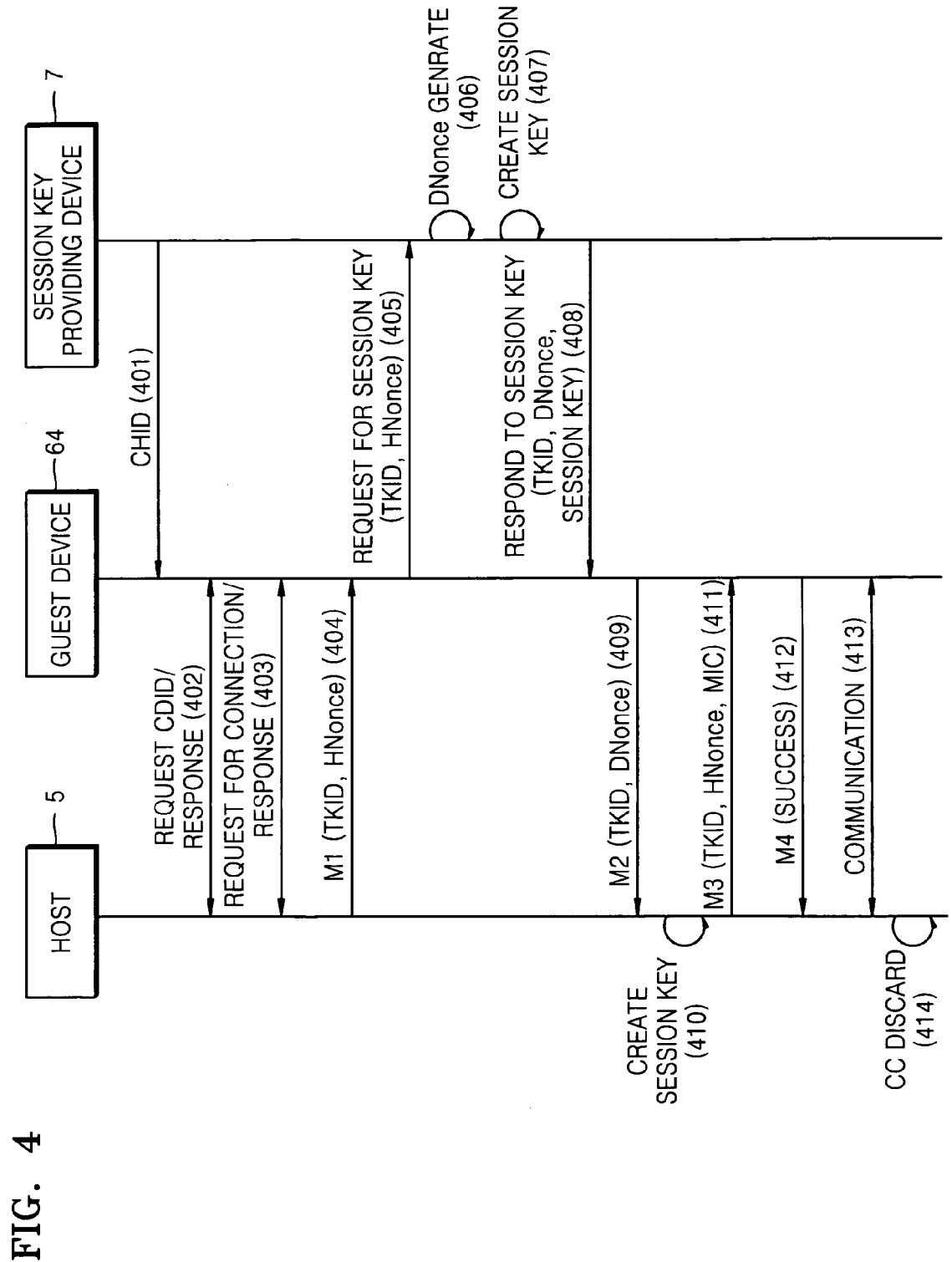
FIG. 4 is a flowchart of a WUSB security communication method according to an exemplary embodiment of the present invention.

FIG. 4 is a flowchart of a WUSB security communication method according to an exemplary embodiment of the present invention. Referring to FIG. 4, the WUSB system as illustrated in FIG. 3 time-serially performs the WUSB security communication method.

The session key providing device 7 detects the guest device 64, and provides a connection host ID (CHID) to the guest device 64 (Operation 401).

The guest device 64 requests the host 5 to send a connection device ID (CDID) according to a protocol agreed by the host 5 and the guest device 64, and the host 5 provides the CDID to the guest device 64 in response to the request (Operation 402). The protocol can be designed as a server/client model such as a dynamic host configuration protocol (DHCP).

The host 5 obtains a CC including the CHID, the CDID, and SEED KEY CK, whereas the guest device 64 obtains the CHID and the CDID only. In the current and subsequent exemplary embodiments, the session key providing device 7 holds the SEED KEY CK instead of the guest device 64. The session key providing device 7 creates the session key based on the SEED KEY CK whenever the optional guest device is connected to the host, and provides the session key to the optional guest device.

The guest device 64 provides the CDID to the host 5 to request a connection with the host 5, and the host 5 transmits a response indicating that the guest device 64 is connected to the host 5 to the guest device 64 (Operation 403).

The host 5 transmits a message M1 including information for identifying the session key, TKID, and a HNonce to the guest device 64 (Operation 404). According to a 4-way handshake of the WUSB standards, the host 5 and the guest device 64 exchange four messages to each other to obtain a session key. The message M1 is a first message of the four messages.

The guest device 64 provides the TKID and the HNonce to the session key providing device 7 to request the session key (Operation 405).

The session key providing device 7 generates a DNonce (Operation 406).

The session key providing device 7 creates a session key corresponding to the TKID based on an address of the host 5, an address of the guest device 64, the HNonce, the DNonce, and the SEED KEY CK (Operation 407).

The session key providing device 7 provides the TKID, the DNonce, and the session key to the guest device 64 (Operation 408).

The guest device 64 transmits a message M2 including the TKID and the DNonce to the host 5 (Operation 409). The message M2 is the second message of the four messages.

The host 5 creates a session key corresponding to the TKID based on the address of the host 5, the address of the guest device 64, the HNonce, the DNonce, and the SEED KEY CK (Operation 410).

The host 5 calculates a message integrity code (MIC). The host 5 then transmits a message M3 including the TKID, the DNonce that is the information for authenticating the session key, and the MIC to the guest device 64 (Operation 411).

The guest device 64 calculates a MIC, if the MIC is identical to the MIC obtained from the host 5, installs the session key, and transmits a message M4 indicating the session key is successfully installed to the host 5 (Operation 412).

The guest device 64 performs secured communications with the host 5 using the session key during a session (Operation 413).

The host 5 deletes the CC regarding the guest device 64, and releases the session between the host 5 and the guest device 64 (Operation 414).

Figure 5:
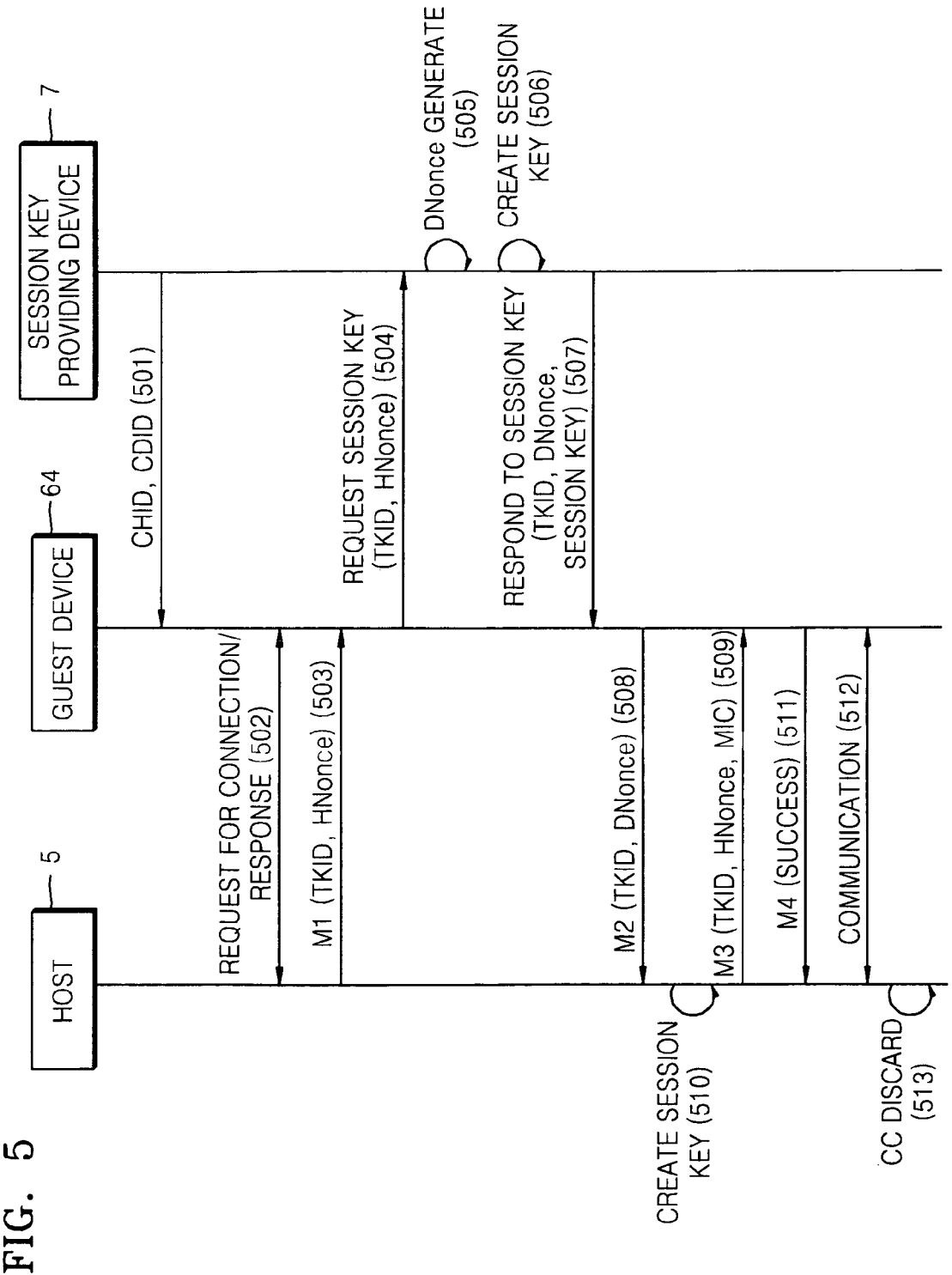
FIG. 5 is a flowchart of a WUSB security communication method according to another exemplary embodiment of the present invention.

FIG. 5 is a flowchart of a WUSB security communication method according to another exemplary embodiment of the present invention. Referring to FIG. 5, the WUSB system illustrated in FIG. 3 performs the WUSB security communication method in time series.

The session key providing device 7 detects the guest device 64, and provides a CHID and a CDID to the guest device 64 (Operation 501).

The guest device 64 provides a CDID to the host 5 to request a connection with the host 5, and the host 5 transmits a response indicating that the guest device 64 is connected to the host 5 in response to the request (Operation 502).

The host 5 transmits a message M1 including information for identifying the session key, TKID, and a HNonce to the guest device 64 (Operation 503).

The guest device 64 provides the TKID and a HNonce to the session key providing device 7 to request a session key (Operation 504).

The session key providing device 7 generates a DNonce (Operation 505).

The session key providing device 7 creates a session key corresponding to the TKID based on an address of the host 5, an address of the guest device 64, the HNonce, the DNonce, and the SEED KEY CK (Operation 506).

The session key providing device 7 provides the session key, the TKID, and the DNonce to the guest device 64 (Operation 507).

The guest device 64 transmits a message M2 including the TKID and the DNonce to the host 5 (Operation 508).

The host 5 creates a session key corresponding to the TKID based on the address of the host 5, the address of the guest device 64, the HNonce, the DNonce, and the SEED KEY CK (Operation 509).

The host 5 calculates a MIC, and transmits a message M3 including the TKID, the DNonce that is information for authenticating the session key, and the MIC to the guest device 64 (Operation 510).

The guest device 64 calculates a MIC, if the MIC is identical to the MIC obtained from the host 5, installs the session key, and transmits a message M4 indicating the session key is successfully installed to the host 5 (Operation 511).

The guest device 64 performs secured communications with the host 5 using the session key during a session (Operation 512).

The host 5 deletes the CC regarding the guest device 64, and releases the session between the host 5 and the guest device 64 (Operation 513).

Figure 6:
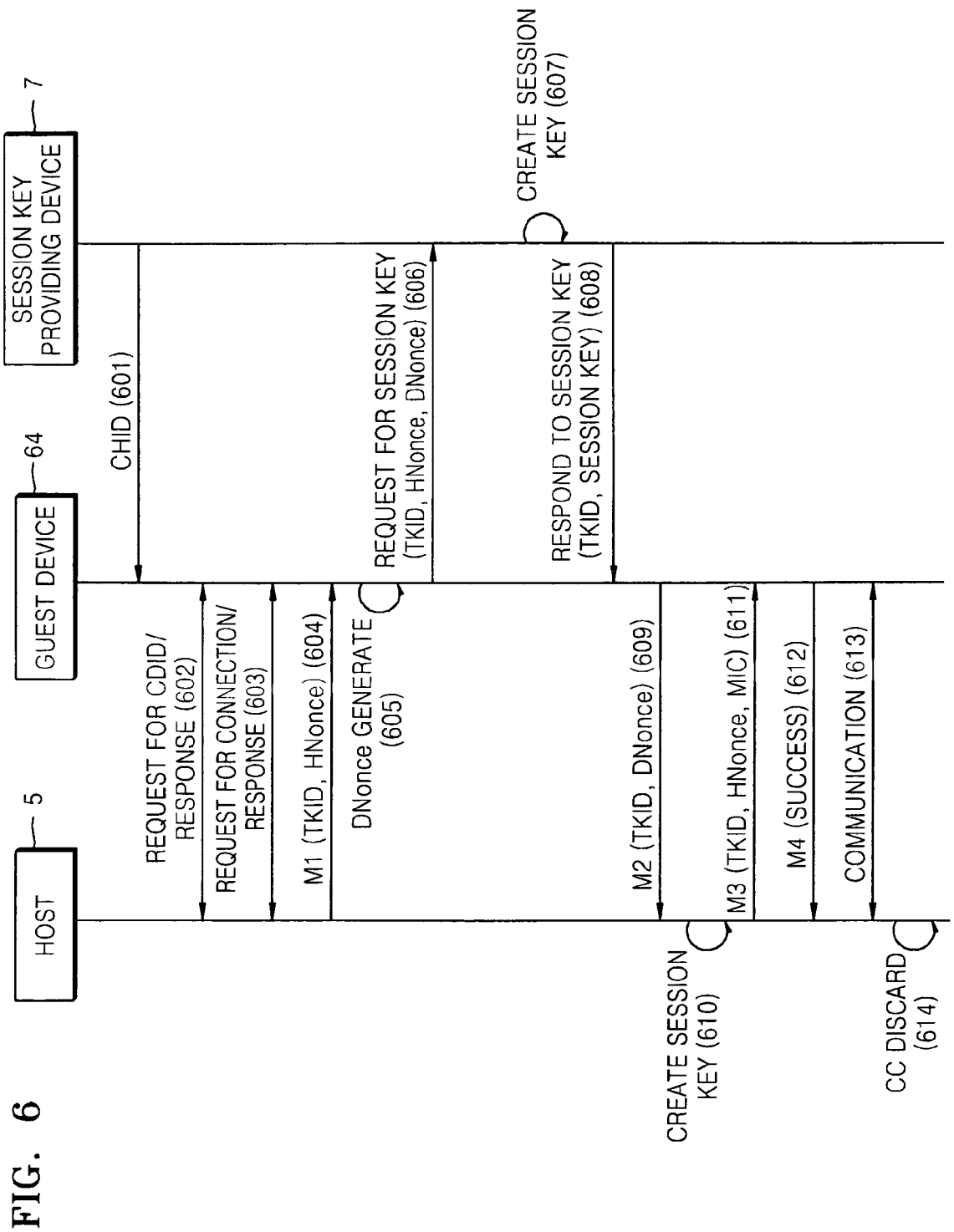
FIG. 6 is a flowchart of a WUSB security communication method according to another exemplary embodiment of the present invention.

FIG. 6 is a flowchart of a WUSB security communication method according to another exemplary embodiment of the present invention. Referring to FIG. 6, the WUSB system illustrated in FIG. 3 performs the WUSB security communication method serially in time.

The session key providing device 7 detects the guest device 64, and provides a CHID to the guest device 64 (Operation 601).

The guest device 64 requests the host 5 to send a CDID according to a protocol agreed by the host 5 and the guest device 64, and the host 5 provides the CDID to the guest device 64 in response to the request (Operation 602). The host 5 obtains a CC including the CHID, the CDID, and a SEED KEY CK, whereas the guest device 64 obtains the CHID and the CDID only.

The guest device 64 provides the CDID to the host 5 to request a connection with the host 5, and the host 5 transmits a response indicating that the guest device 34 is connected to the host 5 to the guest device 64 (Operation 603).

The host 5 transmits a message M1 including information for identifying a session key, TKID, and a HNonce to the guest device 64 (Operation 604).

The guest device 64 generates a DNonce (Operation 605).

The guest device 64 provides the TKID, the HNonce, and the DNonce to the session key providing device 7 to request the session key (Operation 606).

The session key providing device 7 creates a session key corresponding to the TKID based on an address of the host 5, an address of the guest device 64, the HNonce, the DNonce, and the SEED KEY CK (Operation 607).

The session key providing device 7 provides the TKID and the session key to the guest device 64 (Operation 608).

The guest device 64 transmits a message M2 including the TKID and the DNonce to the host 5 (Operation 609).

The host 5 creates a session key corresponding to the TKID based on the address of the host 5, the address of the guest device 64, the HNonce, the DNonce, and the SEED KEY CK (Operation 610).

The host 5 calculates a MIC, and transmits a message M3 including the TKID, the DNonce that is the information for authenticating the session key, and the MIC to the guest device 64 (Operation 611).

The guest device 64 calculates a MIC, if the MIC is identical to the MIC obtained from the host 5, it installs the session key, and transmits a message M4 indicating the session key is successfully installed to the host 5 (Operation 612).

The guest device 64 performs secured communications with the host 5 using the session key during a session (Operation 613).

The host 5 deletes the CC regarding the guest device 64, and releases the session between the host 5 and the guest device 64 (Operation 614).

Figure 7:
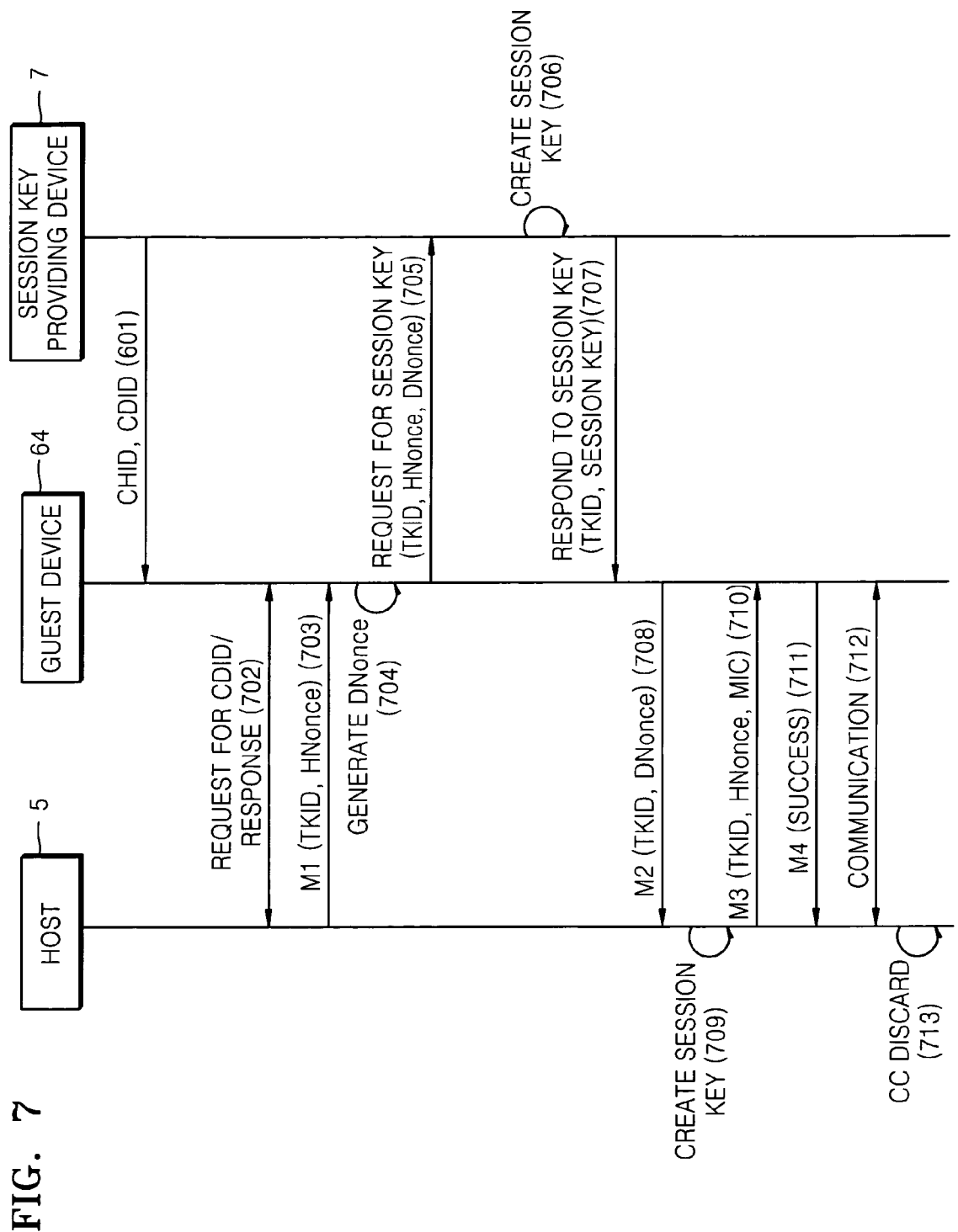
FIG. 7 is a flowchart of a WUSB security communication method according to another exemplary embodiment of the present invention.

FIG. 7 is a flowchart of a WUSB security communication method according to another exemplary embodiment of the present invention. Referring to FIG. 7, the WUSB system illustrated in FIG. 3 performs the NUSB security communication method in time series.

The session key providing device 7 detects the guest device 64, and provides a CHID and a CDID to the guest device 64 (Operation 701). The host 5 obtains a CC including the CHID, the CDID, and a SEED KEY CK, whereas the guest device 64 obtains the CHID and the CDID only.

The guest device 64 provides the CDID to the host 5 to request a connection with the host 5, and the host 5 transmits a response indicating that the guest device 34 is connected to the host 5 to the guest device 64 (Operation 702).

The host 5 transmits a message M1 including information for identifying a session key, TKID, and a HNonce to the guest device 64 (Operation 703).

The guest device 64 generates a DNonce (Operation 704).

The guest device 64 provides the TKID, the HNonce, and the DNonce to the session key providing device 7 in order to request the session key (Operation 705).

The session key providing device 7 creates a session key corresponding to the TKID based on an address of the host 5, an address of the guest device 64, the HNonce, the DNonce, and the SEED KEY CK (Operation 706).

The session key providing device 7 provides the TKID and the session key to the guest device 64 (Operation 707).

The guest device 64 transmits a message M2 including the TKID and the DNonce to the host 5 (Operation 708).

The host 5 creates a session key corresponding to the TKID based on the address of the host 5, the address of the guest device 64, the HNonce, the DNonce, and the SEED KEY CK (Operation 709).

The host 5 calculates a MIC, and transmits a message M3 including the TKID, the DNonce that is the information for authenticating the session key, and the MIC to the guest device 64 (Operation 710).

The guest device 64 calculates a MIC, and if the MIC is identical to the MIC obtained from the host 5, it installs the session key, and transmits a message M4 indicating the session key is successfully installed to the host 5 (Operation 711).

The guest device 64 performs secured communications with the host 5 using the session key during a session (Operation 712).

The host 5 deletes a CC regarding the guest device 64, and releases the session between the host 5 and the guest device 64 (Operation 713).

Figure 8:
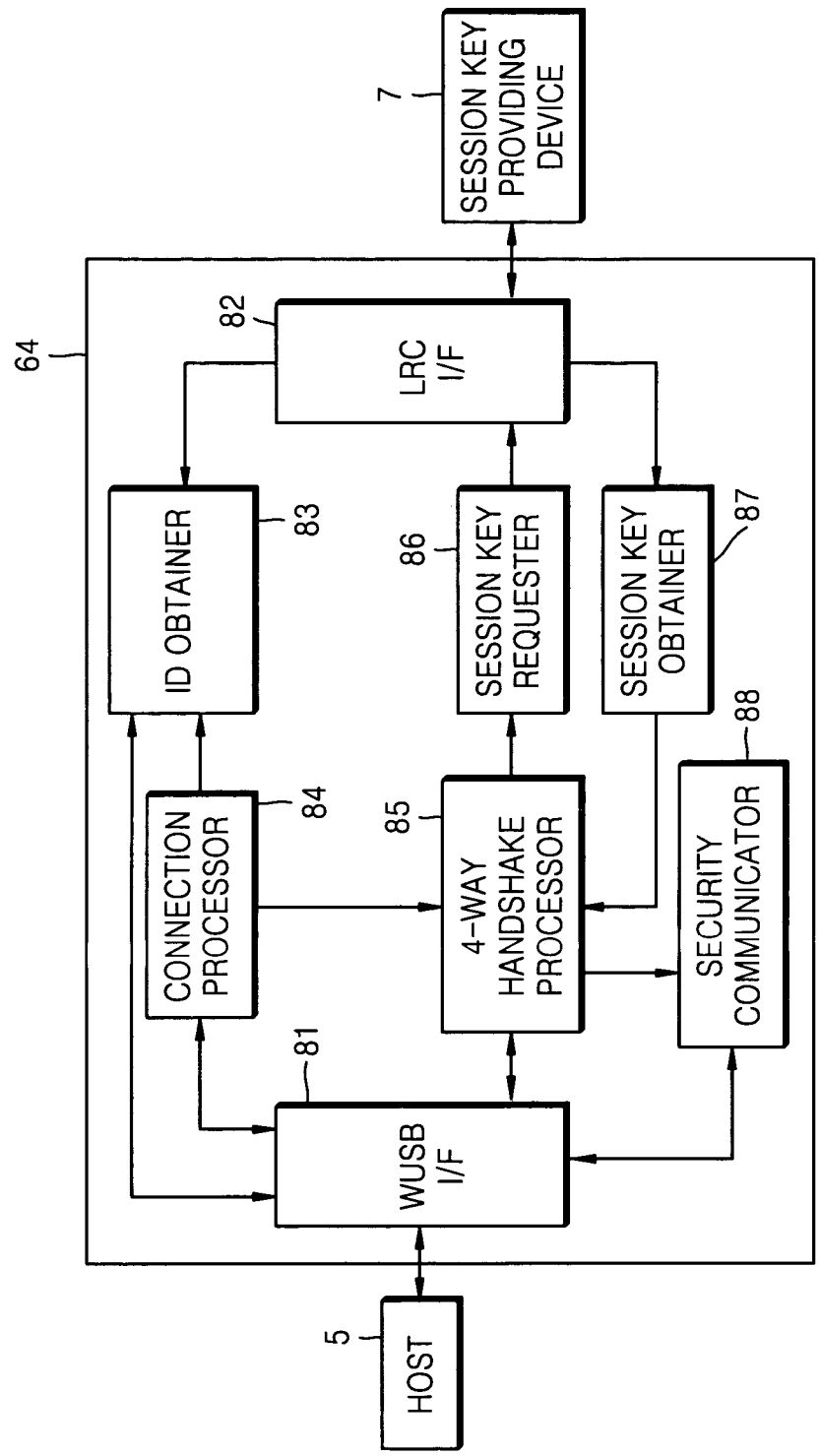
FIG. 8 is a block diagram of a guest device according to an exemplary embodiment of the present invention.

FIG. 8 is a block diagram of the guest device 64 according to an exemplary embodiment of the present invention. Referring to FIG. 8, the guest device 64 comprises a WUSB interface 81, a limited range communication (LRC) interface 82, an ID obtainer 83, a connection processor 84, a 4-way handshake processor 85, a session key requester 86, a session key obtainer 87, and a security communicator 88. The guest device 64 of the current embodiment uses the WUSB security communication method illustrated in FIG. 4 or FIG. 5. Therefore, the WUSB security communication method illustrated in FIG. 4 or FIG. 5 can be applied to the guest device 64 of the current embodiment of the present invention.

The WUSB interface 81 transmits/receives messages and data packets including data via a WUSB communication channel. The WUSB interface 81 receives/transmits messages via a communication channel corresponding to an ultra wideband (UWB) according to WUSB standards.

The LRC interface 82 receives/transmits messages via an LRC communication channel. The LRC indicates a contact or non-contact communication within a short distance below 1 meter, such as a smart card, an infrared data association (IrDA), a near field communication (NFC), bluetooth, radio frequency identification (RFID), etc. The LRC interface 82 receives/transmits messages via a communication channel used by one of the LRCs. The LRC interface 82 receives/transmits messages via the WUSB communication channel used by the WUSB interface 81.

The ID obtainer 83 depends on whether the guest device 64 uses the WUSB security communication method illustrated in FIG. 4 or FIG. 5. If the guest device 64 uses the WUSB security communication method illustrated in FIG. 4, the ID obtainer 83 receives a message including a CHID via the LRC interface to obtain the CHID of the host 5 from the session key providing device 7. The ID obtainer 83 requests the host 5 to send a CDID and obtains the CDID of the guest device 64 from the host 5.

If the guest device 64 uses the WUSB security communication method illustrated in FIG. 5, the ID obtainer 83 receives a message including the CHID and the CDID via the LRC interface to obtain the CHID of the host 5 and the CDID of the guest device 64 from the session key providing device 7.

The connection processor 84 provides the CDID obtained by the ID obtainer to the host 5 having the CHID obtained by the ID obtainer 83 to request a connection with the host 5. More specifically, the connection processor 84 transmits a message including the CDID obtained by the ID obtainer 83 via the WUSB interface 81 to provide the CDID obtained by the ID obtainer 83 to the host 5. The connection processor 84 receives a response from the host 5 for the connection request and recognizes the connection with the host 5.

The 4-way handshake processor 85 exchanges four messages according to the WUSB standards to communicate information necessary for creating a session key and authenticate the session key. The 4-way handshake processor 85 receives a message M1 including a temporal key ID (TKID) and a HNonce via the WUSB interface 81 to obtain the TKID and the HNonce connected to the connection processor 84 from the host 5. The TKID is used to identify an encoding key of a packet transmitted between the host 5 and the guest device 64. The HNonce is generated by the host 5.

The 4-way handshake processor 85 transmits a message M2 including a TKID and a DNonce via the WUSB interface 81 in response to the message M1 to provide the TKID and the DNonce to the host 5. The TKID is identical to the TKID included in the message M1. The DNonce is generated by the session key providing device 7.

The 4-way handshake processor 85 receives a message M3 including a TKID, a HNonce, and a MIC via the WUSB interface 81 in response to the message M2 to obtain the TKID, the HNonce, and the MIC from the host 5.

The 4-way handshake processor 85 calculates a MIC, if the MIC is identical to the MIC provided by the host 5, installs the session key, and transmits a message M4 indicating that the session key is successfully installed via the WUSB interface

81. If the MIC is identical to the MIC provided by the host 5, the 4-way handshake processor 85 is disconnected from the host 5.

The session key requester 86 provides the TKID which is information obtained by the 4-way handshake processor 85 and the HNonce to the session key providing device 7 to request a session key. More specifically, the session key requester 86 transmits a message including the TKID which is information obtained by the 4-way handshake processor 85 and the HNonce via the LRC interface 82 to provide the TKID and the HNonce to the session key providing device 7.

The session key obtainer 87 obtains the session key, a TKID which is information for identifying the session key, and the DNonce which is information necessary for creating the session key in response to the request of the session key requester 86. More specifically, the session key obtainer 87 receives a message including the session key, the TKID, and the DNonce which is information necessary for creating the session key via the LRC interface 82 to obtain the session key, the TKID, and the DNonce.

The security communicator 88 performs a security communication with the host 5 during a session using the session key installed by the 4-way handshake processor 85. More specifically, the security communicator 88 encodes a data packet using the session key installed by the 4-way handshake processor 85 via the WUSB interface 81, and transmits the encoded data packet via the WUSB interface 81. The security communicator 88 receives a data packet via the WUSB interface 81 and decodes the received data packet using the session key installed by the 4-way handshake processor 85 to perform secured communications with the host 5.

Since the security communicator 88 performs the security communication with the host 5 during the session using the session key installed by the 4-way handshake processor 85, if a user releases the session between the host 5 and the guest device 64, the guest device 64 cannot communicate with the host 5 without permission of the user. The session between the host 5 and the guest device 64 is released by deleting the CHID from the guest device or the CDID from the host 5 according to the WUSB standards and discarding the CC including the CHID and the CDID.

Figure 9:
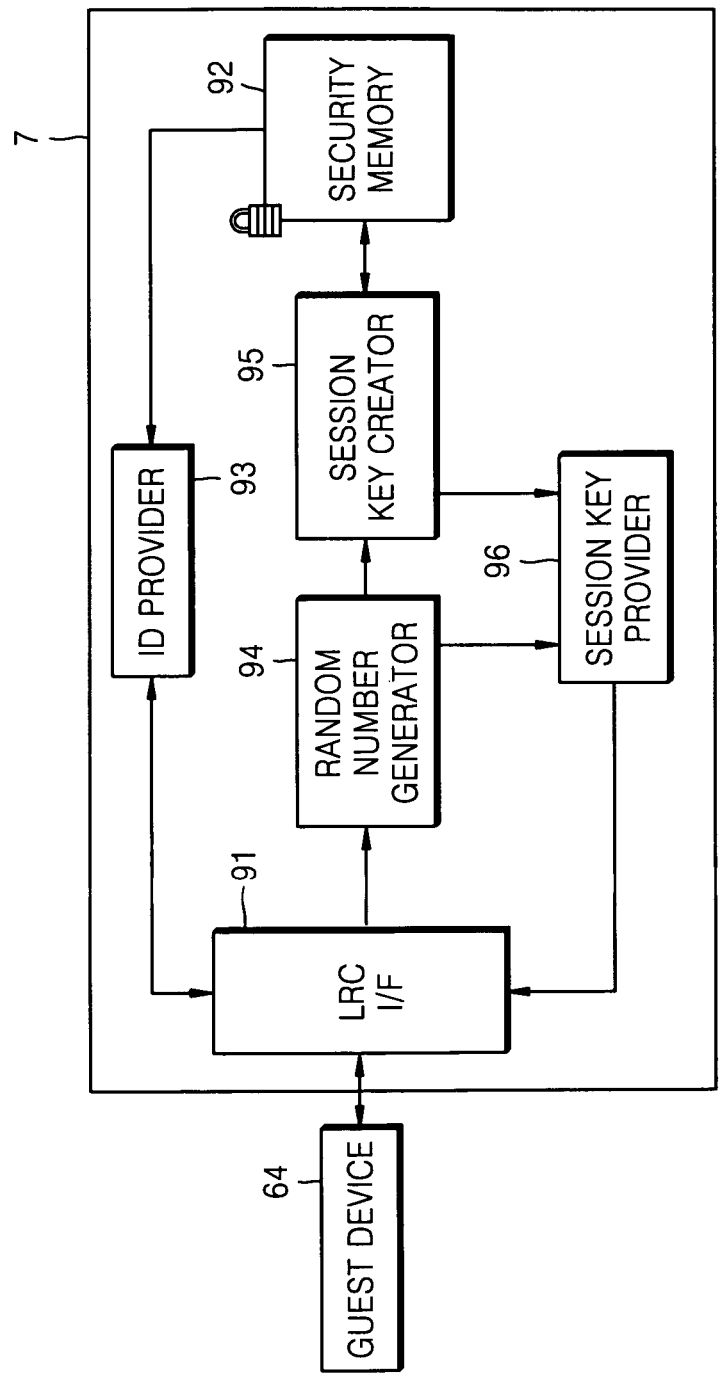
FIG. 9 is a block diagram of a session key providing device according to an exemplary embodiment of the present invention.

FIG. 9 is a block diagram of the session key providing device 7 according to an exemplary embodiment of the present invention. Referring to FIG. 9, the session key providing device 7 comprises an LRC interface 91, a security memory 92, an ID provider 93, a random number generator 94, a session key creator 95, and a session key provider 96. The session key providing device 7 of the current embodiment uses the WUSB security communication method illustrated in FIG. 4 or FIG. 5. Therefore, the WUSB security communication method illustrated in FIG. 4 or FIG. 5 can be applied to the session key providing device 7 of the current embodiment of the present invention.

The LRC interface 91 receives/transmits messages via an LRC communication channel.

The security memory 92 is a storage region that is not allowed by devices including the guest device 64. For example, an electrically erasable programmable read-only memory (EEPROM) produced by Dallas Semiconductor, DS2432, includes a secure hash algorithm (SHA)-1 engine.

The security memory 92 depends on whether the session key providing device 7 uses the WUSB security communication method illustrated in FIG. 4 or FIG. 5. If the session key providing device 7 uses the WUSB security communication method illustrated in FIG. 4, the security memory 92 stores a CHID of the host 5 which is a host of devices providing the session key of the session key providing device 7.

If the session key providing device 7 uses the WUSB security communication method illustrated in FIG. 5, the security memory 92 stores CDIDs of devices such as the guest device 64 connected to the host 5 in addition to the CHID of the host 5. A user of the host 5 stores a SEED KEY CK held by the host 5, the CHID, and the CDIDs in the security memory 92 so that the session key providing device 7 can provide the session key to the devices connected to the host 5. The user of the host 5 manually inputs the SEED KEY CK, the CHID, and the CDIDs in the security memory 92, or accesses the session key providing device 7 to automatically download the SEED KEY CK, the CHID, and the CDIDs in the security memory 92. In the latter case, the host must include the LRC interface 91.

The ID provider 93 depends on whether the session key providing device 7 uses the WUSB security communication method illustrated in FIG. 4 or FIG. 5. If the session key providing device 7 uses the WUSB security communication method illustrated in FIG. 4, the ID provider 93 detects the guest device 64 and transmits a message including the CHID stored in the security memory via the LRC interface 91 to provide the CHID to the guest device 64.

If the session key providing device 7 uses the WUSB security communication method illustrated in FIG. 5, the ID provider 93 generates a CDID such as an Auto IP according to universal plug and play (UPnP) standards, and stores the CDID in the security memory 92. More specifically, the host 5 determines a maximum number N of guest devices connected to the host 5 and a specific string guest device ID (GUID) which is a SEED KEY CK for generating the CDID, and provides the determined maximum number N of guest devices and the GUID to the session key providing device 7. The ID provider 93 obtains the maximum number N of guest devices connected to the host 5 and the specific string GUID which is the SEED KEY CK for generating the CDID, adds values from 1 through N to the GUID, generates the CDID, and stores the CDID in the security memory 92.

The ID provider 93 detects the guest device 64 and transmits a message including the CHID and the CDID stored in the security memory 92 via the LRC interface 91 to provide the CHID and the CDID to the guest device 64.

The random number generator 94 obtains a TKID and a HNonce from the host 5, and generates a DNonce if the random number generator 94 receives a session key request.

The session key creator 95 creates a session key to be used during a session between the host 5 and the guest device 64 based on the information obtained according to the session key request. More specifically, the session key creator 95 receives a message including the TKID and the HNonce via the LRC interface 91 to obtain the TKID and the HNonce, and create the session key corresponding to the TKID based on an address of the host 5, an address of the guest device 64, the HNonce, the DNonce obtained from the host 5, and the SEED KEY CK stored in the security memory 92. The address of the host 5 and the address of the guest device 64 are recorded in an origination address field and a destination address field of a header of the message.

The session key provider 96 transmits a message including the session key created by the session key creator 95, the TKID, and the DNonce generated by the random number generator 94 which is information necessary for creating the session key to provide the session key, the TKID, and the DNonce to the guest device 64.

Figure 10:
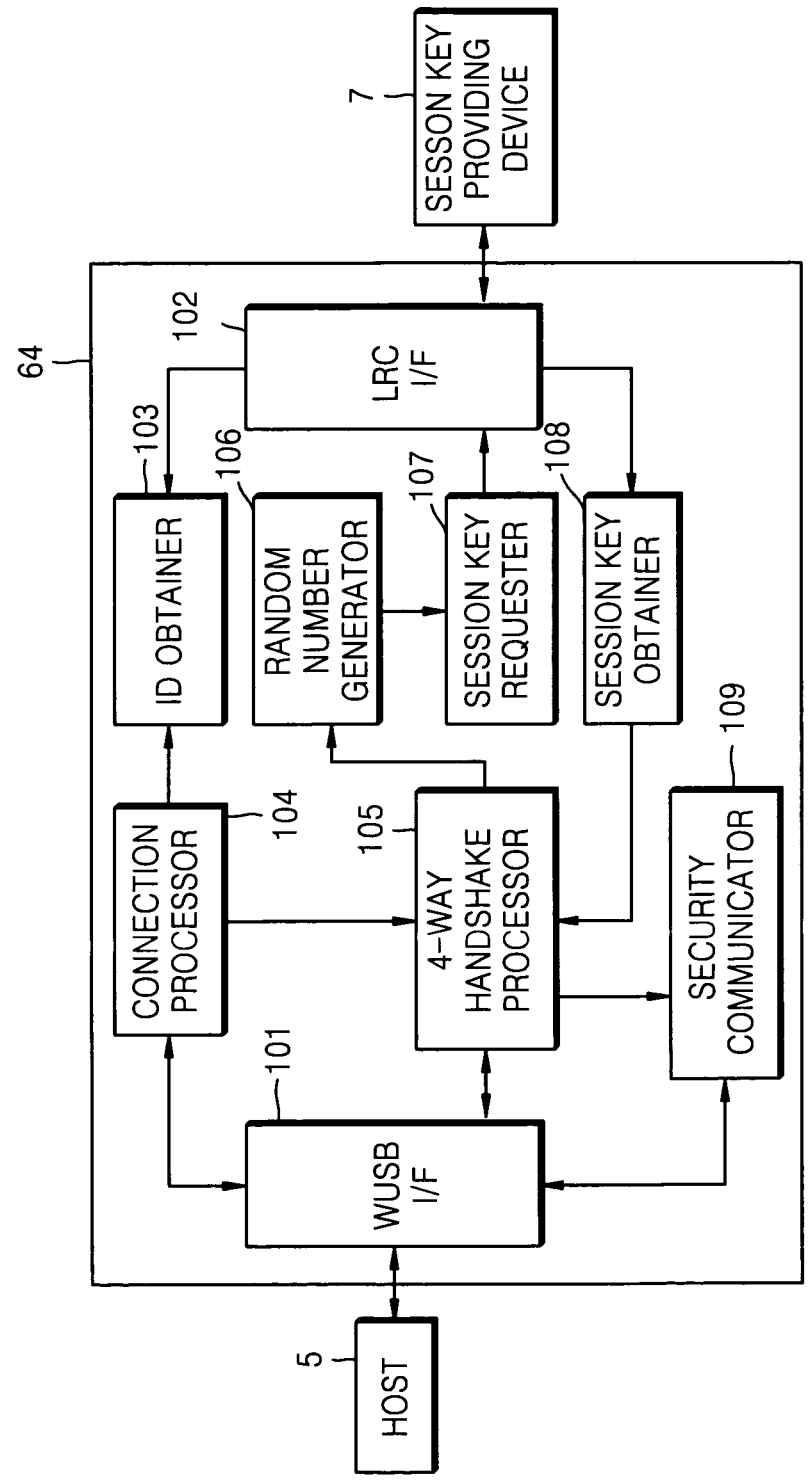
FIG. 10 is a block diagram of a guest device according to another exemplary embodiment of the present invention.

FIG. 10 is a block diagram of the guest device 64 according to another exemplary embodiment of the present invention. Referring to FIG. 10, the guest device 64 comprises a WUSB interface 101, an LRC interface 102, an ID obtainer 103, a connection processor 104, a 4-way handshake processor 105, a random number generator 106, a session key requester 107, a session key obtainer 108, and a security communicator 109. The guest device 64 of the current embodiment uses the WUSB security communication method illustrated in FIG. 6 or FIG. 7. Therefore, the WUSB security communication method illustrated in FIG. 6 or FIG. 7 can be applied to the guest device 64 of the current embodiment of the present invention.

The WUSB interface 101 transmits/receives messages and data packets including data via a WUSB communication channel. The LRC interface 102 receives/transmits messages via an LRC communication channel.

The operation of the ID obtainer 103 depends on whether the guest device 64 uses the WUSB security communication method illustrated in FIG. 6 or FIG. 7. If the guest device 64 uses the WUSB security communication method illustrated in FIG. 6, the ID obtainer 103 receives a message including a CHID via the LRC interface 102 to obtain the CHID of the host 5 from the session key providing device 7. The ID obtainer 83 requests the host 5 to send a CDID according to a protocol agreed by the host 5 and the guest device 64 and obtains the CDID of the guest device 64 from the host 5 in response to the request.

If the guest device 64 uses the WUSB security communication method illustrated in FIG. 7, the ID obtainer 103 receives a message including the CHID and the CDID via the LRC interface 102 to obtain the CHID of the host 5 and the CDID of the guest device 64 from the session key providing device 7.

The connection processor 104 provides the CDID obtained by the ID obtainer 103 to the host 5 having the CHID obtained by the ID obtainer 103 to request a connection with the host 5. The 4-way handshake processor 105 exchanges four messages according to the WUSB standards to communicate information necessary for creating a session key and authenticate the session key.

The random number generator 106 obtains a TKID which is information for identifying the session key and a HNonce which is information necessary for creating the session key from the host 5 using the 4-way handshake processor 105, and generates a DNonce.

The session key requester 107 provides the TKID which is information obtained by the 4-way handshake processor 105, the HNonce, and the DNonce generated by the random number generator 106 to the session key providing device 7 to request the session key. More specifically, the session key requester 107 transmits a message including the TKID which is information obtained by the 4-way handshake processor 105, the HNonce, and the DNonce generated by the random number generator 106 via the LRC interface 102 to provide the TKID, the HNonce, and the DNonce to the session key providing device 7.

The session key obtainer 108 obtains the session key and the TKID in response to the request of the session key requester 107. More specifically, the session key obtainer 108 receives a message including the session key and the TKID via the LRC interface 102 to obtain the session key and the TKID.

The security communicator 109 performs a security communication with the host 5 during a session using the session key installed by the 4-way handshake processor 105.

Figure 11:
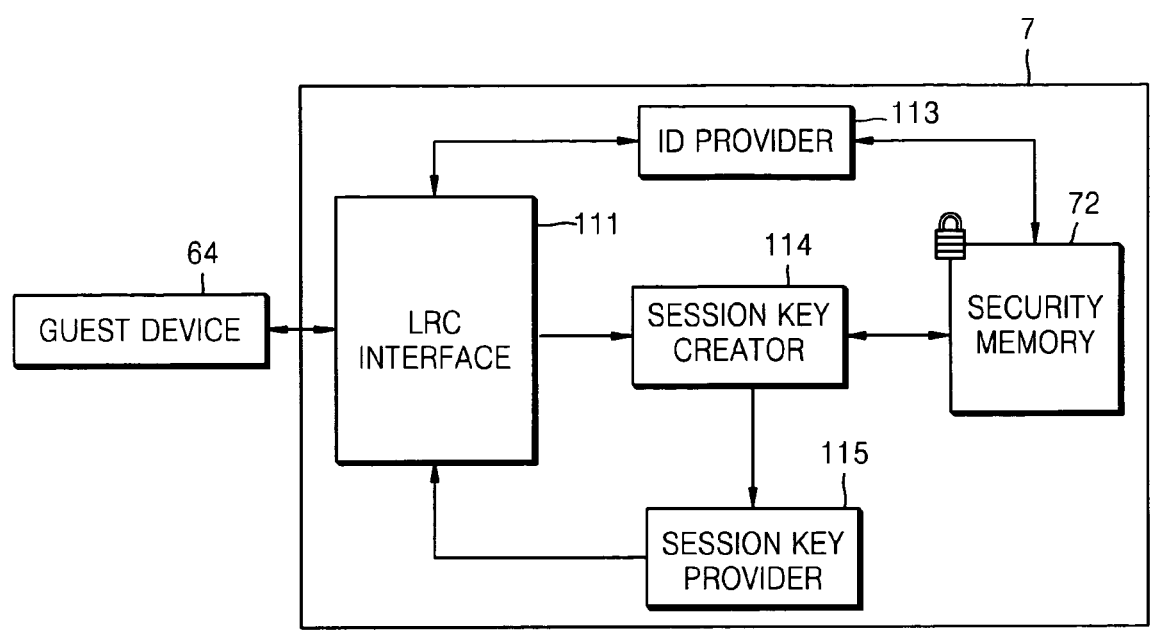
FIG. 11 is a block diagram of a session key providing device according to another exemplary embodiment of the present invention.

FIG. 11 is a block diagram of the session key providing device 7 according to another exemplary embodiment of the present invention. Referring to FIG. 11, the session key providing device 7 comprises an LRC interface 111, a security memory 112, an ID provider 113, a session key creator 114, and a session key provider 115. The session key providing device 7 of the current embodiment uses the WUSB security communication method illustrated in FIG. 6 or FIG. 7. Therefore, the WUSB security communication method illustrated in FIG. 6 or FIG. 7 can be applied to the session key providing device 7 of the current embodiment of the present invention.

The LRC interface 111 receives/transmits messages via an LRC communication channel. The security memory 112 is a storage region that is not allowed by devices including the guest device 64.

The security memory 112 depends on whether the session key providing device 7 uses the WUSB security communication method illustrated in FIG. 6 or FIG. 7. If the session key providing device 7 uses the WUSB security communication method illustrated in FIG. 6, the security memory 112 stores a CHID of the host 5 which is a host of devices providing the session key of the session key providing device 7. If the session key providing device 7 uses the WUSB security communication method illustrated in FIG. 7, the security memory 112 stores CDIDs of devices such as the guest device 64 connected to the host 5 in addition to the CHID of the host 5.

The ID provider 113 depends on whether the session key providing device 7 uses the WUSB security communication method illustrated in FIG. 6 or FIG. 7. If the session key providing device 7 uses the WUSB security communication method illustrated in FIG. 6, the ID provider 113 detects the guest device 64 and transmits a message including the CHID stored in the security memory 112 via the LRC interface 111 to provide the CHID to the guest device 64.

If the session key providing device 7 uses the WUSB security communication method illustrated in FIG. 75, the ID provider 113 obtains a maximum number N of guest devices connected to the host 5 and a specific string GUID which is a SEED KEY CK for generating the CDID, adds values from 1 through N to the GUID, generates the CDID, and stores the CDID in the security memory 112. The ID provider 113 detects the guest device 64 and transmits a message including the CHID and the CDID stored in the security memory 112 via the LRC interface 111 to provide the CHID and the CDID to the guest device 64.

The session key creator 114 obtains a TKID, a HNonce, and a DNonce from the host 5 to receive a request for a session key, and creates the session key to be used during a session between the host 5 and the guest device 64 based on the information obtained according to the request for the session key. More specifically, the session key creator 114 obtains a message including the TKID, the HNonce, and the DNonce via the LRC interface 91 to obtain the TKID, the HNonce, and the DNonce and creates the session key corresponding to the TKID based on an address of the host 5, an address of the guest device 64, the HNonce, the a DNonce obtained from the host 5, and a SEED KEY CK stored in the security memory 112. The address of the host 5 and the address of the guest device 64 are recorded in an origination address field and a destination address field of a header of the message.

The session key provider 115 transmits a message including the session key created by the session key creator 114 and the TKID via the LRC interface 111 to provide the session key and the TKID to the guest device 64.

Figure 12:
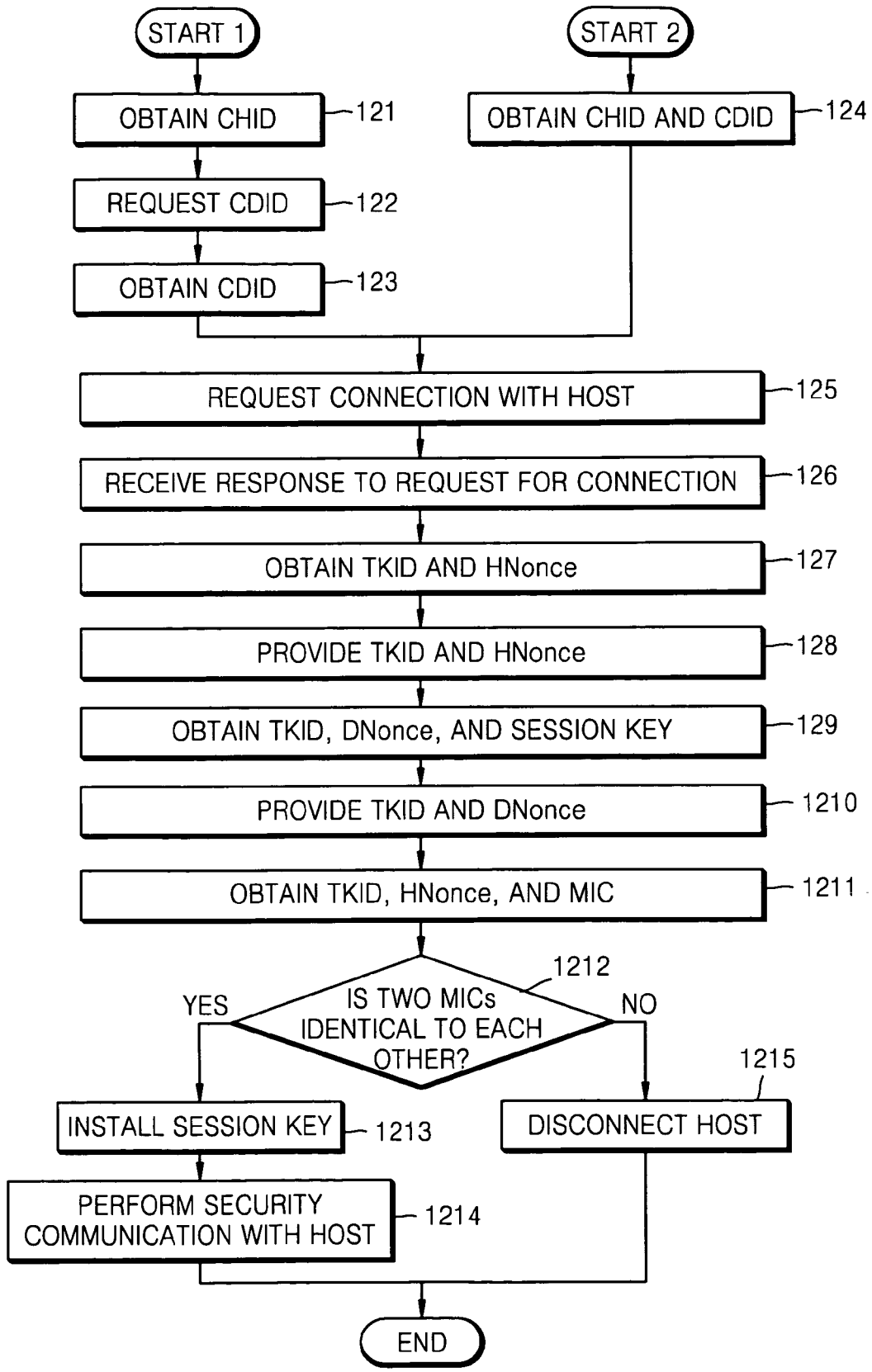
FIG. 12 is a flowchart of a method of obtaining a session key according to an exemplary embodiment of the present invention.

FIG. 12 is a flowchart of a method of obtaining a session key according to an exemplary embodiment of the present invention. Referring to FIG. 12, the guest device 64 illustrated in FIG. 8 time-serially performs the method of obtaining the session key of the current embodiment of the present invention. Therefore, the method of obtaining the session key of the current embodiment of the present invention can be applied to the guest device 64 illustrated in FIG. 8.

If the method of obtaining the session key of the current embodiment of the present invention is applied to an apparatus using the WUSB security communication method illustrated in FIG. 4, Operation 124 follows Operations 121, 122, and 123. If the method of obtaining the session key of the current embodiment of the present invention is applied to an apparatus using the WUSB security communication method illustrated in FIG. 5, Operation 125 follows Operation 124.

The guest device 64 obtains a CHID of the host 5 from the session key providing device 7 (Operation 121).

The guest device 64 requests the host 5 having the CHID to send a CDID (Operation 122).

The guest device 64 obtains the CDID of the guest device 64 in response to the request (Operation 123).

The guest device 64 obtains a CHID of the host 5 and a CDID of the guest device 64 from the session key providing device 7 (Operation 124).

The guest device 64 provides the CDID obtained in Operation 123 or 124 to the host 5 to request a connection with the host 5 (Operation 125).

The guest device 64 receives a response to the request for the connection with the host 5 and recognizes that the guest device 64 is connected to the host 5 (Operation 126).

The guest device 64 obtains a TKID which is information for identifying a session key and a HNonce from the host 5 connected to the guest device 64 (Operation 127).

The guest device 64 provides the TKID and the HNonce to the session key providing device 7 to request for the session key (Operation 128).

The guest device 64 obtains the session key, the TKID, and a DNonce which is information necessary for creating the session key in response to the request for the session key (Operation 129).

The guest device 64 provides the TKID and the DNonce to the host 5 (Operation 1210).

The guest device 64 obtains the TKID, and the HNonce, and a MIC from the host 5 (Operation 1211).

The guest device 64 calculates a MIC, if the MIC is identical to the MIC obtained in Operation 1210, performs Operation 1213, and if the MIC is not identical to the MIC obtained in Operation 1210, performs Operation 1215 (Operation 1212).

The guest device 64 installs the session key, and informs the host 5 of the successful installation of the session key (Operation 1213).

The guest device 64 performs secured communications with the host 5 using the session key installed in Operation 1213 during a session (Operation 1214).

The guest device 64 is disconnected from the host 5 (Operation 1215).

Figure 13:
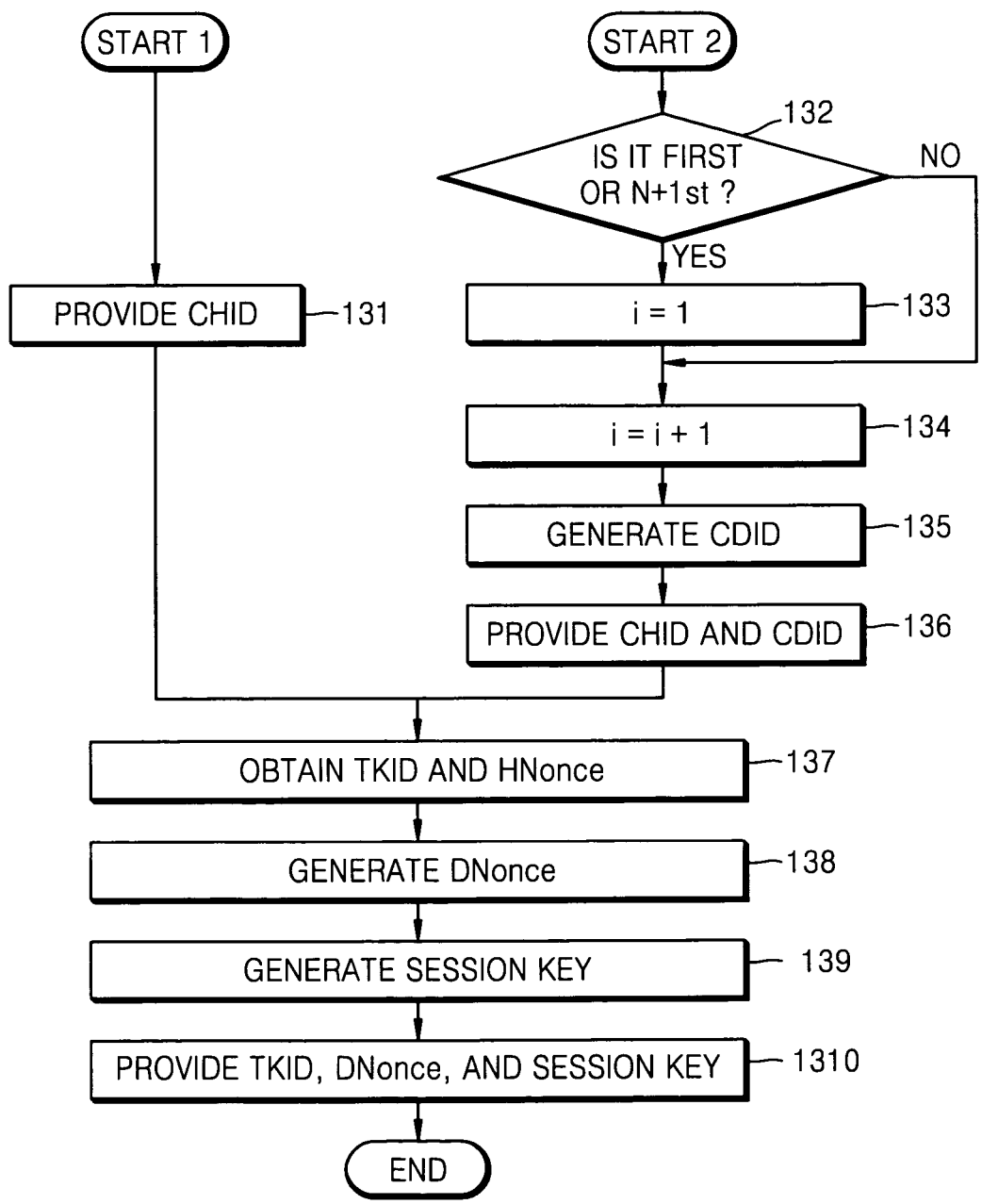
FIG. 13 is a flowchart of a method of providing a session key according to an exemplary embodiment of the present invention.

FIG. 13 is a flowchart of a method of providing a session key according to an exemplary embodiment of the present invention. Referring to 13, the session key providing device 7 illustrated in FIG. 9 time-serially performs the method of providing the session key of the current embodiment of the present invention. Therefore, the method of providing the session key of the current embodiment of the present invention can be applied to the session key providing device 7 illustrated in FIG. 9.

If the method of providing the session key of the current embodiment of the present invention is applied to an apparatus using the WUSB security communication method illustrated in FIG. 4, Operation 137 follows Operation 131. If the method of providing the session key of the current embodiment of the present invention is applied to an apparatus using the WUSB security communication method illustrated in FIG. 5, Operation 137 follows Operations 132 through 136.

The session key providing device 7 detects the guest device 64 and provides a CHID to the guest device 64 (Operation 131).

The session key providing device 7 detects the guest device 64, decides what number the guest device 64 has, and if the guest device 64 is a first guest device or an N+1$^{st}$ guest device when the maximum number of guest devices connected to the host 5 is N, performs Operation 133, and, performs Operation 134 (Operation 132).

The session key providing device 7 establishes a number i of the guest device 64 as 1 (Operation 133).

The session key providing device 7 adds the number i of the guest number 64 to a specific string GUID which is a SEED KEY CK value for generating a CDID of the guest device 64 (Operation 134).

The session key providing device 7 increases the number i of the guest device 64 by 1 (Operation 135).

The session key providing device 7 provides a CHID and the CDID to the guest device 64 (Operation 136).

The session key providing device 7 obtains the TKID and the HNonce from the host 5 to receive a request for the session key (Operation 137).

The session key providing device 7 generates a DNonce (Operation 138).

The session key providing device 7 generates the session key to be used during a session between the host 5 and the guest device 64 based on information obtained according to the request for the session key and the DNonce (Operation 139).

The session key providing device 7 provides the session key, the TKID, and the DNonce (Operation 1310).

Figure 14:
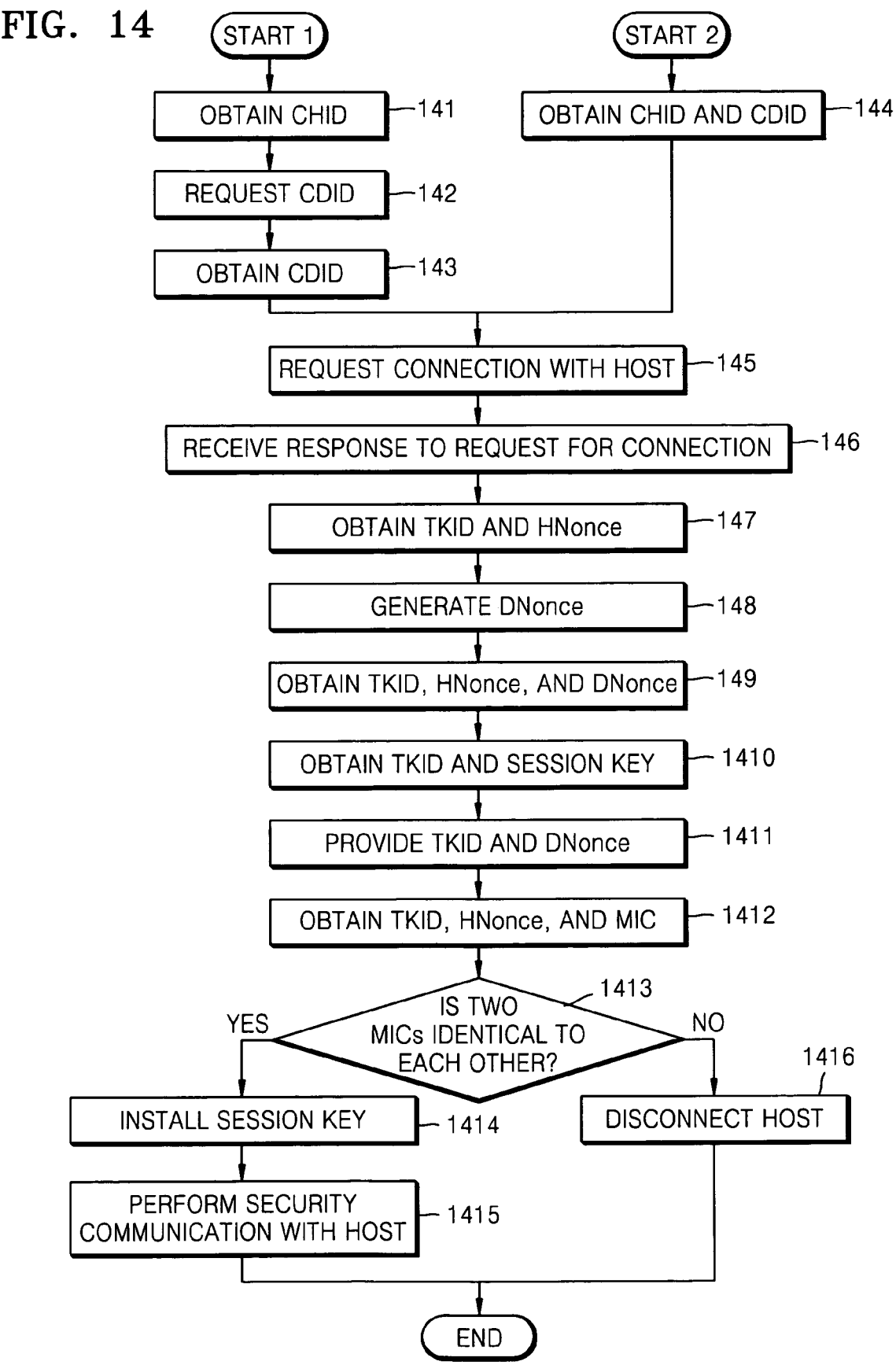
FIG. 14 is a flowchart of a method of obtaining a session key according to another exemplary embodiment of the present invention.

FIG. 14 is a flowchart of a method of obtaining a session key according to another exemplary embodiment of the present invention. Referring to FIG. 14, the guest device 64 illustrated in FIG. 10 time-serially performs the method of obtaining the session key of the current embodiment of the present invention. Therefore, the method of obtaining the session key of the current embodiment of the present invention can be applied to the guest device 64 illustrated in FIG. 10.

If the method of obtaining the session key of the current embodiment of the present invention is applied to an apparatus using the WUSB security communication method illustrated in FIG. 6, Operation 144 follows Operations 141, 142, and 143. If the method of obtaining the session key of the current embodiment of the present invention is applied to an apparatus using the WUSB security communication method illustrated in FIG. 7, Operation 145 follows Operation 144.

The guest device 64 obtains a CHID of the host 5 from the session key providing device 7 (Operation 141).

The guest device 64 requests the host 5 having the CHID to send a CDID (Operation 142).

The guest device 64 obtains the CDID of the guest device 64 in response to the request for the CDID (Operation 143).

The guest device 64 obtains a CHID of the host 5 and a CDID of the guest device 64 from the session key providing device 7 (Operation 144).

The guest device 64 provides the CDID obtained in Operation 143 or 144 to the host 5 to request a connection with the host 5 (Operation 145).

The guest device 64 receives a response to the request for the connection with the host 5 and recognizes that the guest device 64 is connected to the host 5 (Operation 146).

The guest device 64 obtains a TKID which is information for identifying the session key and a HNonce from the host 5 connected to the guest device 64 (Operation 147).

The guest device 64 generates a DNonce (Operation 148).

The guest device 64 provides the TKID, the HNonce, and the DNonce to the session key providing device 7 to request for the session key (Operation 149).

The guest device 64 obtains the session key in response to the request for the session key and the TKID (Operation 1410).

The guest device 64 provides the TKID and the DNonce to the host 5 (Operation 1411).

The guest device 64 obtains the TKID, the HNonce, and a MIC from the host 5 (Operation 1412).

The guest device 64 calculates a MIC, if the MIC is identical to the MIC obtained in Operation 1412, performs Operation 1414, and if the MIC is not identical to the MIC obtained in Operation 1412, performs Operation 1416 (Operation 1413).

The guest device 64 installs the session key, and informs the host 5 of the successful installation of the session key (Operation 1414).

The guest device 64 performs secured communications with the host 5 using the session key installed in Operation 1414 during a session (Operation 1415).

The guest device 64 is disconnected from the host 5 (Operation 1416).

Figure 15:
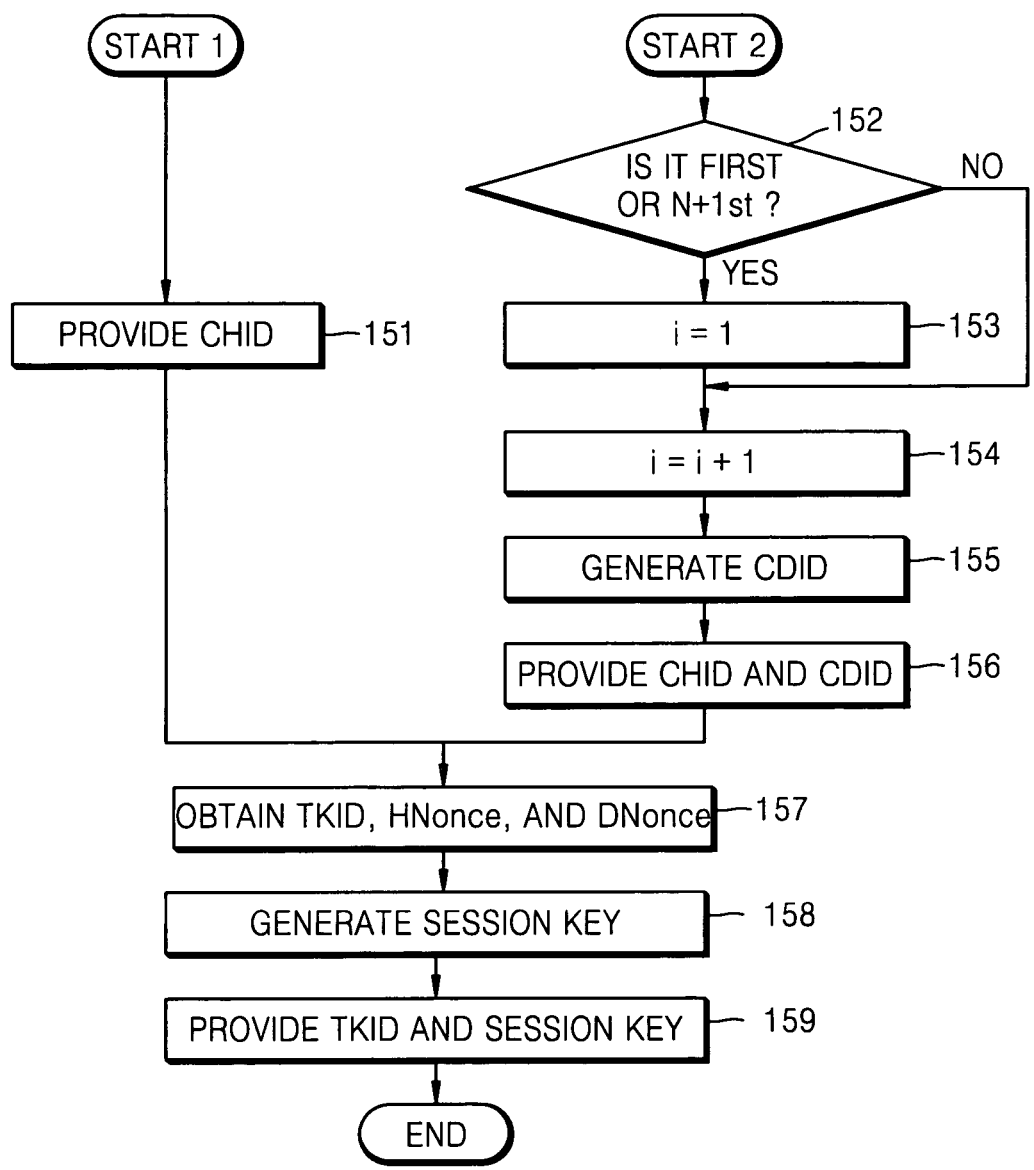
FIG. 15 is a flowchart of a method of providing a session key according to another exemplary embodiment of the present invention.

FIG. 15 is a flowchart of a method of providing a session key according to another exemplary embodiment of the present invention. Referring to 15, the session key providing device 7 illustrated in FIG. 11 time-serially performs the method of providing the session key of the current embodiment of the present invention. Therefore, the method of providing the session key of the current embodiment of the present invention can be applied to the session key providing device 7 illustrated in FIG. 11.

If the method of providing the session key of the current embodiment of the present invention is applied to an apparatus using the WUSB security communication method illustrated in FIG. 6, Operation 157 follows Operation 151. If the method of providing the session key of the current embodiment of the present invention is applied to an apparatus using the WUSB security communication method illustrated in FIG. 7, Operation 157 follows Operations 152 through 156.

The session key providing device 7 detects the guest device 64 and provides a CHID to the guest device 64 (Operation 151).

The session key providing device 7 detects the guest device 64, decides what number the guest device 64 has, if the guest device 64 is a first guest device or an $N+1^{st}$ guest device when the maximum number of guest devices connected to the host 5 is N, performs Operation 153, and performs Operation 154 (Operation 152).

The session key providing device 7 establishes a number i of the guest device 64 as 1 (Operation 153).

The session key providing device 7 adds the number i of the guest number 64 to a specific string GUID which is a SEED KEY CK value for generating a CDID to generate the CDID of the guest device 64 (Operation 154).

The session key providing device 7 increases the number i of the guest device 64 by 1 (Operation 155).

The session key providing device 7 provides a CHID and the CDID to the guest device 64 (Operation 156).

The session key providing device 7 obtains a TKID, a HNonce, and a DNonce from the host 5 to receive a request for the session key (Operation 157).

The session key providing device 7 generates the session key to be used during a session between the host 5 and the guest device 64 based on information obtained according to the request for the session key (Operation 158).

The session key providing device 7 provides the session key and the TKID to the guest device 64 (Operation 159).

The present invention can also be embodied as computer readable code on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices.

According to the present invention, since a session key providing device provides a session key to a guest device whenever the guest device is temporarily connected to a host, it is not necessary to distribute a CC which is information necessary for creating the session key to the guest device, thereby increasing user convenience and maintaining security of a WUSB communication.

Since the session key providing device creates a session key based on a SEED KEY CK stored in a security memory whenever a guest device is temporarily connected to a host, the session key providing device does not need to create the SEED KEY CK. Therefore, it is not necessary to update a WUSB system for an update of a CC whenever the guest device is temporarily connected to the host. That is, the WUSB system of the present invention uses the SEED KEY CK without update which is one of constituents of the CC when the guest device is temporarily connected to the host and updates an ID of the guest device, thereby reducing loads of the host and devices.

While the present invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A method of providing a session key to be used during a session between a host and a device in a wireless universal serial bus (WUSB) security communication, the method comprising:
(a) receiving a first random number corresponding to the host from the device;
(b) generating a second random number corresponding to the device;
(c) creating the session key based on a seed key, the first and second random numbers; and
(d) providing the session key and the second random number to the device,
wherein the seed key is stored in a region provided in an apparatus other than the host that is inaccessible by the device such that the seed key is not provided to the device.

2. The method of claim 1, further comprising:
providing a host ID of the host to the device; and
receiving information necessary for creating the session key provided by the host having the host ID from the device,
wherein operation (a) creates the session key based on the information and the seed key.

3. The method of claim 1, further comprising:
detecting the device and providing a specific device ID to the device; and
receiving a request for the session key from the device that received the specific device ID,
wherein operation (c) creates the session key after receiving the request.

4. The method of claim 1, wherein the host and the device are based on wireless universal serial bus (WUSB) standards and wherein the device is a temporarily connected peripheral device.

5. An apparatus for providing a session key to be used during a session between a host and a device in a wireless universal serial bus (WUSB) security communication, the apparatus comprising:
- an interface unit which receives a first random number corresponding to the host from the device; and
- a controller which generates a second random number corresponding to the device, and creates the session key based on a seed key, the first and second random numbers;
- wherein the interface unit further provides the second random number and the session key to the device, and
- wherein the seed key is stored in a region provided in the apparatus other than the host that is inaccessible by the device such that the seed key is not provided to the device.

6. A non-transitory computer-readable storage medium having embodied thereon a computer program for executing a method of providing a session key to be used during a session between a host and a device in a wireless universal serial bus(WUSB) security communication, the method comprising:
- (a) receiving a first random number corresponding to the host from the device;
- (b) generating a second random number corresponding to the device;
- (c) creating the session key based on a seed key, the first and second random numbers; and
- (d) providing the session key and the second random number to the device,
- wherein the seed key is stored in a region provided in an apparatus other than the host that is inaccessible by the device such that the seed key is not provided to the device.

7. A method of obtaining a session key corresponding to a session between a host and a device in a wireless universal serial bus(WUSB) security communication, the method comprising:
- (a) receiving a device ID for creating a session key from a session key providing device
- (b) providing the device ID to the host to request for a connection with the host;
- (c) receiving first information required to create the session key from the host, wherein the first information is a random number corresponding to the host
- (d) providing the first information to the session key providing device for creating the session key; and
- (e) receiving the session key from the session key providing device;
- wherein the session key is generated at the session key providing device based on the random number, the seed key, and another random number generated by the device and which corresponds to the device, and
- wherein the seed key is stored in the session key providing device that is inaccessible by the device such that the seed key is not provided to the device.

8. The method of claim 7, further comprising: (f) receiving a host ID of the host from the apparatus for creating the session key,
wherein operation (c) receives the first information required to create the session key from the host having the host ID.

9. The method of claim 7, wherein operation (e) receives the session key and said another random number required to create the session key as a response to the request,
wherein operation (b) provides said another random number to the host.

10. The method of claim 7, wherein the host and the device are based on WUSB standards.

11. An apparatus for obtaining a session key corresponding to a session between a host and a device in a wireless universal serial bus (WUSB) security communication, the apparatus comprising:
- an interface unit which receives a device ID for creating a session key from a session key providing device and receives first information required to create the session key from the host, wherein the first information is a random number corresponding to the host; and
- a controller which controls to provide the device ID to the host to request for a connection with the host and provide the first information to the session key providing device for creating the session key,
- wherein the interface unit further receives the session key from the session key providing device, the session key is generated at the session key providing device based on the random number, the seed key, and another random number generated by the device and which corresponds to the device, and
- wherein the seed key is stored in the session key providing device that is inaccessible by the device such that the seed key is not provided to the device.

12. A non-transitory computer-readable storage medium having embodied thereon a computer program for executing a method of obtaining a session key corresponding to a session between a host and a device in a wireless universal serial bus (WUSB) security communication, the method comprising:
- (a) receiving a device ID for creating a session key from a session key providing device;
- (b) providing the device ID to the host to request for a connection with the host;
- (c) receiving first information required to create the session key from the host, wherein the first information is a random number corresponding to the host;
- (d) providing the first information to the session key providing device for creating the session key; and
- (e) receiving the session key from the session key providing device;
- wherein the session key is generated at the session key providing device based on the random number, the seed key, and another random number generated by the device and which corresponds to the device, and
- wherein the seed key is stored in the session key providing device that is inaccessible by the device such that the seed key is not provided to the device.

13. The method of claim 1, further comprising:
calculating a message integrity code (MIC) in the host;
transmitting the calculated MIC to the device;
calculating another MIC in the device;
comparing said transmitted MIC with said calculated another MIC in the device; and
installing the session key in the device based on said comparison.

14. The method of claim 1, wherein the region is a secure memory installed in the apparatus and wherein the apparatus is dedicated to providing the session key to the device.

* * * * *